US008131703B2

(12) United States Patent
Bessieres et al.

(10) Patent No.: US 8,131,703 B2
(45) Date of Patent: Mar. 6, 2012

(54) ANALYTICS BASED GENERATION OF ORDERED LISTS, SEARCH ENGINE FEED DATA, AND SITEMAPS

(75) Inventors: Marshall Bessieres, Palo Alto, CA (US); Kevin Wallace, San Francisco, CA (US); King Rhoton, San Francisco, CA (US); James McTiernan, Gloucester, MA (US); Brian Herring, Durham, CA (US); Jianmin Wu, Cupertino, CA (US); Steven Kusmer, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 240 days.

(21) Appl. No.: 11/735,840

(22) Filed: Apr. 16, 2007

(65) Prior Publication Data

US 2007/0244883 A1 Oct. 18, 2007

Related U.S. Application Data

(60) Provisional application No. 60/744,851, filed on Apr. 14, 2006.

(51) Int. Cl.
*G06F 17/30* (2006.01)
(52) U.S. Cl. ......... 707/706; 707/717; 707/721; 707/723
(58) Field of Classification Search .................. 707/1–7, 707/104.1, 717, 721, 723
See application file for complete search history.

(56) References Cited

U.S. PATENT DOCUMENTS

| 6,640,218 | B1 * | 10/2003 | Golding et al. ........................ 1/1 |
| 7,181,438 | B1 * | 2/2007 | Szabo ............................... 707/2 |
| 7,860,895 | B1 * | 12/2010 | Scofield et al. ................ 707/802 |
| 2003/0208482 | A1 * | 11/2003 | Kim et al. .......................... 707/3 |
| 2003/0208578 | A1 * | 11/2003 | Taraborelli et al. ........... 709/223 |
| 2005/0071465 | A1 * | 3/2005 | Zeng et al. ..................... 709/224 |
| 2005/0076097 | A1 * | 4/2005 | Sullivan et al. ............... 709/218 |
| 2005/0144162 | A1 * | 6/2005 | Liang ................................. 707/3 |
| 2005/0149504 | A1 * | 7/2005 | Ratnaparkhi ..................... 707/3 |
| 2005/0154723 | A1 * | 7/2005 | Liang ................................. 707/3 |
| 2005/0165889 | A1 * | 7/2005 | Muret et al. ................... 709/203 |
| 2006/0095431 | A1 * | 5/2006 | Nash ................................. 707/7 |
| 2007/0027754 | A1 * | 2/2007 | Collins et al. ................... 705/14 |
| 2007/0112622 | A1 * | 5/2007 | Meggs ............................ 705/14 |
| 2007/0185871 | A1 * | 8/2007 | Canright et al. .................. 707/7 |
| 2007/0239713 | A1 * | 10/2007 | Leblang et al. .................. 707/6 |

OTHER PUBLICATIONS

Glenn Murray, Jagger, Google Analytics, and the Future of Search & SEO, Article Alley, Nov. 19, 2005.

* cited by examiner

*Primary Examiner* — Hanh Thai
(74) *Attorney, Agent, or Firm* — Robert C. Kowert; Meyertons, Hood, Kivlin, Kowert & Goetzel, P.C.

(57) ABSTRACT

Systems and methods are described that provide for generating ordered search results based on dynamic web analytics data that allows a resulting list of records that is responsive to a query to be ranked in a fashion that improves user satisfaction and conversion success rate. The system interrogates a target website to build a database of products and services. The individual pages/products in the database of products and services are ranked based on analytics data. Responses to searches of the target website are ordered as list of records that reflects the analytics data, which improves the ordering of the list of records based on criteria such as web page popularity, product popularity, or conversion success rate. Further embodiments provide for the generation of appropriately ordered search engine feed data based on the ranked database of products and services for the target website as well as the generation of search engine sitemaps with an appropriate priority attribute based on the analytics data.

14 Claims, 5 Drawing Sheets

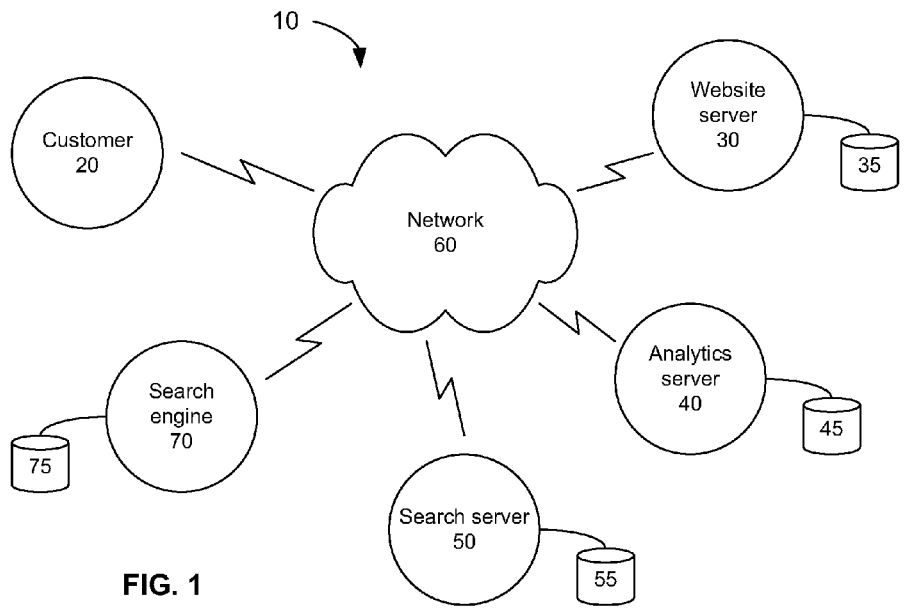
FIG. 1
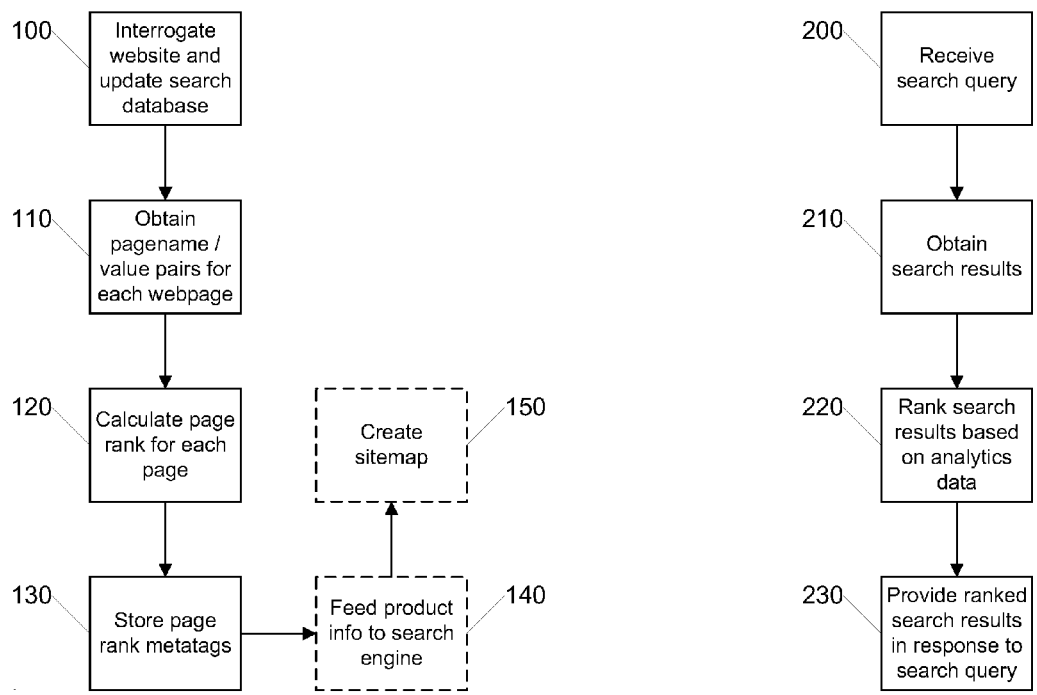
FIG. 2
FIG. 3

ANALYTICS BASED GENERATION OF ORDERED LISTS, SEARCH ENGINE FEED DATA, AND SITEMAPS

RELATED APPLICATION

The present application claims priority to U.S. provisional patent application Ser. No. 60/744,851 filed on Apr. 14, 2006, which is incorporated herein by reference in its entirety.

BACKGROUND

1. Field of the Invention

The present invention relates generally to computerized information retrieval and more particularly is directed toward the ordering of lists of records returned in response to a set of search criteria.

2. Related Art

Website providers generally desire that their website search solution provide the best possible results because site search has been shown to have a conversion rate (i.e., the percentage of visitors who take a desired action) that is greater than that of overall site conversion rates. Accordingly, website providers understand that a satisfying site search experience for users will lead to increased sales, higher customer contentment, and lower customer service costs.

Characteristics that lead to successful site search solutions include: (1) Scope—Includes every page or product on the site(s); (2) Speed—Results are available immediately; (3) Currency—All information is completely up-to-date; (4) Recall—Finds every document and/or product that is relevant to the query; (5) Precision—No irrelevant pages or products are included in the results; and (6) Ranking—The most relevant results come first, less relevant results come later.

All six of these characteristics are handled well by conventional systems, but the hardest one to do well is ranking. Conventional methods use page information (title, body, metadata) and site architecture information to determine what pages should be shown in what order. At best, this information helps identify what the visitor wants to find; that is, the top slot on the first page of results is what the visitor wishes. At worst, it is only a loose correlation. For example, a product named "winter backpack" might be found lower in the results list than "backpack soap" when a visitor searched for "backpack", mostly driven by the fact that the "backpack soap" product included the word "backpack" in the product description more often. This is true of all search engines, and while each has special enhancements to improve relevancy, all search algorithms may yet be improved, especially through the use of additional data sources beyond site content and architecture.

The most often provided enhancement supporting site search optimization is to give control to the customer by allowing them to incorporate tuning, such as with keywords, synonyms, target tags, direct hits, and more, to further guide what results show, and in which order they are shown. However, this process requires manual tuning and intervention, which is a laborious process.

Other conventional ranking methods include interrogating a website and using any information in the site to drive relevancy. In particular, data obtained in this way is not limited to data found in a product database. For example, a website may include both products (with pricing, title, description, and more) and supporting content such as press releases and product rewards. Additional conventional ranking methods may use other techniques including adjusting the weightings for standard document elements and adding new metadata for consideration by the ranking algorithms (e.g., a "rank" metatag).

What is yet needed, however, is an efficient and accurate system and method to better optimize search results automatically, thereby overcoming these significant problems found in the conventional systems as described above.

SUMMARY

Disclosed herein are systems and methods for obtaining information from a target website and generating a database of pages that are ranked based on dynamic web analytics data. Accordingly, in response to a search of the target website, the responsive list of records is ordered in a fashion that improves user satisfaction and conversion success rate. Embodiments described herein provide a system that interrogates a target website to build a database of products and services. The individual pages in the data of products and services are ranked based on analytics data. Responses to user searches of the target website are then ordered as a list of records that incorporates the analytics data to improve the order of the list of records based on predetermined criteria such as web page popularity, product popularity, and/or conversion success rate. By incorporating dynamic analytics data into the process for ordering the list of records, the overall relevancy of the list of records is considerably improved.

Further embodiments described herein allow the website search server to generate appropriately ordered search engine feed data based on the ranked database of products and services for the target website. This appropriately ordered search engine feed data is then provided to a generic search engine such or a comparison shopping search engine to facilitate improved search results. Additional embodiments described herein allow the website search server to generate sitemaps with an appropriate priority attribute based on the dynamic website browsing analytics data. These sitemaps can then be used by web search engine crawlers in the collection of data about the target website.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is a network diagram illustrating an example system for generation of ordered lists, search engine feed data, and sitemaps based on dynamic analytics data according to an embodiment of the present invention;

FIG. 2 is a flow diagram illustrating an example process for creating and ranking a target website database according to an embodiment of the present invention;

FIG. 3 is a flow diagram illustrating an example process for providing an ordered list in response to a search query according to an embodiment of the present invention;

DETAILED DESCRIPTION

Figure 4:
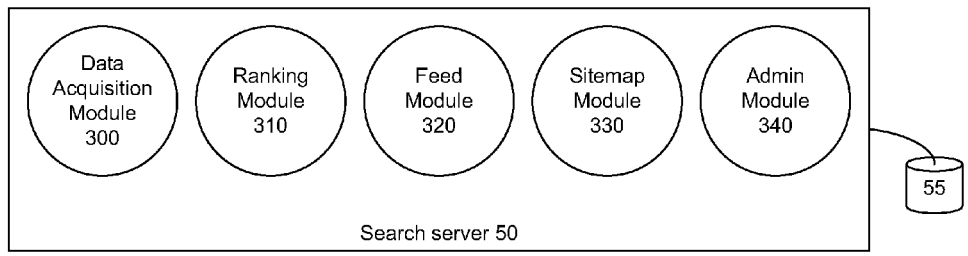
FIG. 4 is a block diagram illustrating an example website search server according to an embodiment of the present invention.

Certain embodiments as disclosed herein provide for generation of ordered lists, search engine feed data, and sitemaps based on dynamic analytics data. After reading this description it will become apparent to one skilled in the art how to implement the invention in various alternative embodiments and alternative applications. Although the invention is directed toward ordered lists in general, the primary embodiment described herein will be related to website search result lists, however, it should be understood that this primary embodiment is presented by way of example only, and not limitation. As such, this detailed description of a primary embodiment and various alternative embodiments should not be construed to limit the scope or breadth of the present invention as set forth in the appended claims.

FIG. 1 is a network diagram illustrating an example system 10 for generation of ordered lists, search engine feed data, and sitemaps based on dynamic analytics data according to an embodiment of the present invention. In the illustrated embodiment, the system 10 comprises a customer device 20 that is communicatively coupled with a website server 30 via a network 60. The website server 30 is similarly communicatively coupled with an analytics server 40 and a search server 50 via the network 60. Also communicatively coupled with the servers 30, 40 and 50 and the customer device 20 via the network 60 is the search engine 70, which can be any of a variety of search engines, for example, the Google search engine.

In one embodiment the network 60 may be the Internet. In alternative embodiments the network 60 can be any combination of one or more wired or wireless networks both public and private. Additionally, the various servers can be separate as shown or they can be combined partially or completely together in a single physical server.

The website server 30 can be any of a variety of website servers that host information content, applications, or other desirable content, applications or both. The website server 30 is configured such that analytics data is collected and stored by the analytics server 40, which may be resident with the website server 30 on the same physical computing device or may be both logically and physically separate as shown. Operation of the website server 30 as a content or application provider is well known and will not be described in further detail herein.

The analytics server 40 can be any of a variety of analytics servers and is configured to collect website browsing information and data regarding how customers or other users interact with a target website being hosted by the website server 30. The analytics server 30 is configured to collect all types of available web analytics data and is further configured to aggregate and segregate the collected information to provide information rich reports that can be extremely granular or extremely broad in nature, as desired.

The search server 50 is configured to interrogate the various pages of a target website hosted by the website server 30. In doing so, the search server 50 creates a database in data storage area 55 reflecting the target website. The search server 50 then obtains analytics data from the analytics server 40 and uses the analytics data to rank the various pages and products that are part of the target website. The search server 50 then creates a sitemap and provides it to the website server 30 for later use by search engine 70. Additionally, the search server 50 also creates feeds based on the ranked pages of the target website and provides such feeds to search engine 70.

As shown, each of the servers 30, 40 and 50 are configured with a data storage area 35, 45 and 55, respectively. The data storage areas can be internal, external, persistent, volatile, fixed, removable, or any combination of these. The function of the data storage areas is to store information and programmed instructions (compiled or interpreted) for use in the generation of ordered lists, search engine feed data, and sitemaps based on dynamic analytics data.

FIG. 2 is a flow diagram illustrating an example process for creating and ranking a target website database according to an embodiment of the present invention. This process can be carried out by the search server previously described with respect to FIG. 1. Initially, in step 100 the server interrogates the target website and creates or updates a database that reflects the various pages and products of the target website and allows the search server to receive and respond to user search queries seeking information related to the target website. Next, in step 110 the server obtains analytics data from the analytics server and uses the analytics data in step 120 to calculate a page rank for each page and/or product in the target website. In one embodiment, the analytics data is obtained by the search server through a stream reporting application programming interface to the analytics server.

With respect to the page rank calculation, the calculation may be based solely upon the analytics data or upon a combination of analytics data and preferences that are set by the owner of the target website. For example, the website owner may desire newer products to have a higher page rank or the website owner may desire to have products with a higher profit margin to have a higher page rank. Accordingly, the website owner may set certain preferences (e.g., by editing a configuration file or setting certain variable definitions) that are then reflected in the page rank calculated by the search server.

Once the target website has been interrogated and the various page ranks have been calculated the page ranks are stored by the search server along with the information related to the target website. For example, the ranking information can be stored as one or more rank metatags that are associated with a particular page or product. Additionally, the search server can optionally create a search engine feed in step 140 from the information about the target website and the respective rankings and provide the feed to one or more search engines such as Google. Furthermore, the search server can optionally create a sitemap in step 150 that advantageously includes all pages of the target website and has priority information for each page that is based on dynamic and up to date analytics information.

FIG. 3 is a flow diagram illustrating an example process for providing an ordered list in response to a search query according to an embodiment of the present invention. This process can be carried out by the search server previously described with respect to FIG. 1. Initially, in step 200 the search server receives a search query. The search server can be separately hosted from the website server and receive the search query, for example, via a network. Next, in step 210 the search server obtains the list of records that is responsive to the search query. This information is obtained from the database that is local to the search server. For example, in an embodiment where the website search functionality is hosted separate from the website server, the search server applies the query to its local database that reflects the target website.

Upon obtaining the list of records that is responsive to the query, the search server next in step 220 ranks the results based on analytics data. This ranking can be accomplished by determining a page rank for each responsive page when the page rank is stored in the local search server database and associated with each respective page. Alternatively, the search server can request analytics data from the analytics server and determine in real time the relative rankings for each record in the list of records that is responsive to the query.

Once the list of records that is responsive to the query has been identified and ranked, the search server then in step 230 provides the ranked list of records in response to the query.

FIG. 4 is a block diagram illustrating an example website search server 50 according to an embodiment of the present invention. The search server is configured with a data storage area 55 for storing information related to one or more target websites and other desirable information for facilitating the generation of ordered lists, search engine feed data, and sitemaps based on dynamic analytics data. In the illustrated embodiment, the search server 50 comprises a data acquisition module 300, a ranking module 310, a feed module 320, a sitemap module 330, and an admin module 340. These modules can be deployed as separate modules as shown or they can be combined in any fashion as desired.

The data acquisition module 300 is configured to access a target website and identify the various pages that make up the target website and obtain and store information about the target website in the data storage area 55. The data acquisition module 300 may accomplish this task of pulling data into the data storage area 55 by crawling the target website, using open database connectivity ("ODBC"), or performing a datafile load, e.g., by obtaining a file via the file transfer program and then loading the file into the database. In one embodiment, the information stored in the data storage area 55 may include information about particular web pages and the products and services that are offered for sale at the target website.

The ranking module 310 is configured to interact with an analytics server to obtain relevant analytics data about particular pages and the products and services that are offered for sale at the target website. The analytics data can include information about web pages including, for example, a conversion value, the number of page visits, the number of entry page visits, a product title, a product category, a time value (for example indicating how long the product has been offered for sale or other temporal aspects related to the product such as how much longer the product will be on sale), a profit margin for the product, and other useful information. Additionally, any other page name/value pair (i.e., information about a particular webpage) can be included in the analytics data.

The ranking module 310 obtains the analytics data from an analytics server and uses that information, possibly in combination with other information (e.g., specific information from the website owner), to provide each page in the target website with a rank. This ranking of the pages of a target website can be performed dynamically in real time as the page is identified as responsive to a search query. Alternatively, the ranking may take place periodically as the database of information about the target website is updated and stored in the data storage area 55. In one embodiment, the ranking module 310 dynamically ranks pages that are identified as responsive to a search query such that the rankings are relative to the specific subset of responsive pages. Similarly, the ranking module 310 may rank all pages in a target website in order to create a complete ranking to be used in connection with creating feeds and sitemaps.

The feed module 320 is configured to generate feed information that can be provided to a search engine such as a comparison shopping engine. Advantageously, analytics data is employed by the feed module 320 in similar fashion as the ranking module 310 such that the feed module 320 can provide appropriately ranked product information to the search engines and thereby optimize the results of any queries to those search engines. The feed module 320 is configured to periodically update the feed information and provide updated feed information to the various search engines so that the feed information reflects the dynamic nature of the analytics data. Advantageously, the real time priority information derived from analytics data allows subsequent feeds to emphasize the most important or most popular pages to the various search engines that are receiving the feed data. For example, if a particular product was selling extremely well in a certain week, that product would be identified in the feed data to a search engine such that searches related to the product would result in the increased chance of the product appearing in the search results from the search engine.

The sitemap module 330 is configured to generate a sitemap for the target website based on the data produced by the data acquisition module 300 and related analytics data. For example, the sitemap module 330 is configured to create a comprehensive list of the various web pages that are part of the target website. The sitemap module 330 is also configured to obtain analytics data from an analytics server and provide that information in the sitemap. For example, the sitemap may allow for a priority attribute to be included for each web page in a website. Thus, the sitemap module 330 is configured to translate analytics data into the priority attribute so that the search engine is kept up to date regarding the most important pages in the website that should be crawled by the search engine. For example, those products/pages that are most successfully converted can be translated into the highest priority attribute value.

The admin module 340 is configured to provide a user interface to a customer and allow the customer to set the parameters that govern the operation of the search server 50. For example, the customer may desire to determine what fields are considered when ranking the pages of a website and the customer may desire to set the relative weighting of those fields that are considered when ranking the pages of a website. Other customer utilities such as reporting, searching, creating or modifying templates, etc. can also be provided by the admin module 340.

Figure 5:
FIG. 5 is a user interface diagram illustrating an example view of a ranking interface according to an embodiment of the present invention.

FIG. 5 is a user interface diagram illustrating an example view of a ranking interface 400 according to an embodiment of the present invention. In the illustrated embodiment, the ranking interface 400 may be part of an admin module such as previously described. As shown in the illustrated embodiment, several fields have been identified that are to be considered when performing the ranking of the various pages that make up a target website. For example, the hbx_conv_value field 410 has been identified as one of the fields to be considered when ranking a page. Also, the field weights/conditions 420 of this particular field has been set to a value of 10, which is more than double the value of any other field. Accordingly, the customer has determined that it desires to rank the pages in the target website with a considerable emphasis on conversion. In alternative embodiments, more or fewer fields may be used to facilitate the ranking of the various pages in a website and as such the user interface allows new fields to be added to the ranking calculation. Existing fields can also be deleted from the ranking calculations. The available fields that can be used reflect at least all of the information that is available from an analytics server and relate to the pages of a target website or the products and services that are offered on a target website.

Figure 6A:
FIG. 6A is a user interface diagram illustrating an example view of a product search query result without analytics based ordering.
Figure 6B:
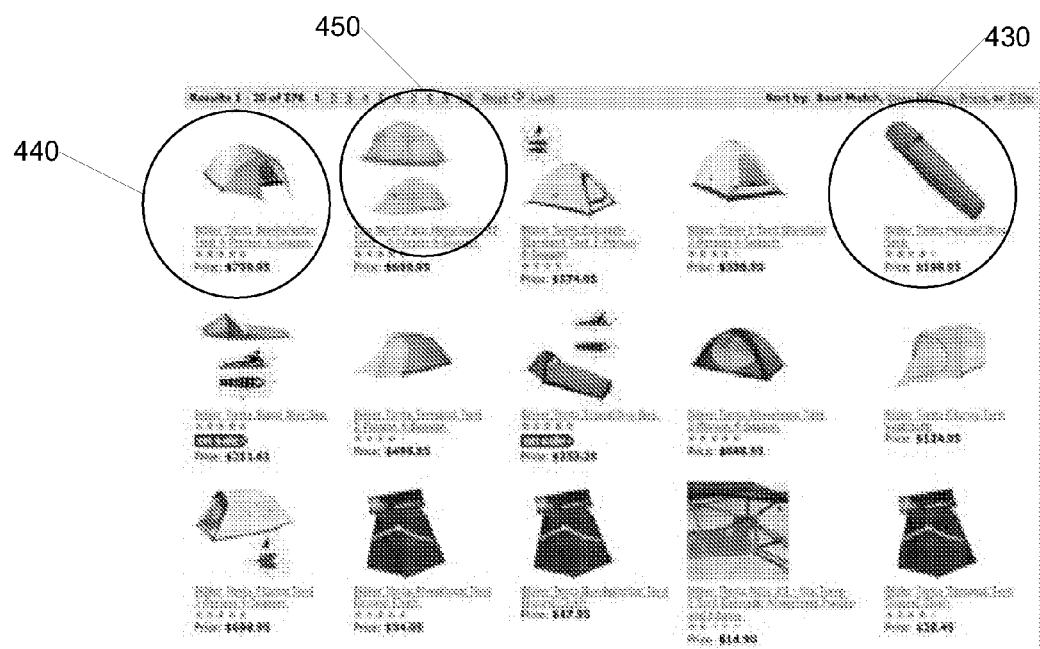
FIG. 6B is a user interface diagram illustrating an example view of a product search query result with analytics based ordering.

FIGS. 6A and 6B are user interface diagrams illustrating example views of product search query results without (6A) and with (6B) analytics based ordering. In the illustrated embodiment of FIG. 6A, the search results display the product 430 in the first position even though product 430 is in fact the fifth most popular product that is purchased by consumers. Additionally in FIG. 6A, the search results display the product 440 in the fourth position even though product 440 is actually the first most popular product that is purchased by consumers. Turning to FIG. 6B, the search results using analytics based ordering display the product 440 in the first position because it is the most popular product purchased by consumers. Similarly, product 430 is displayed in the fifth position because it is the fifth most popular product purchased by consumers. Notably, product 450, which is the second most popular product purchased by consumers, is displayed in the second position in FIG. 6B while in FIG. 6A product 450 is not even displayed on the first page of results.

Figure 7A:
FIG. 7A is a user interface diagram illustrating an example set of results from a Google search for product data.
Figure 7B:
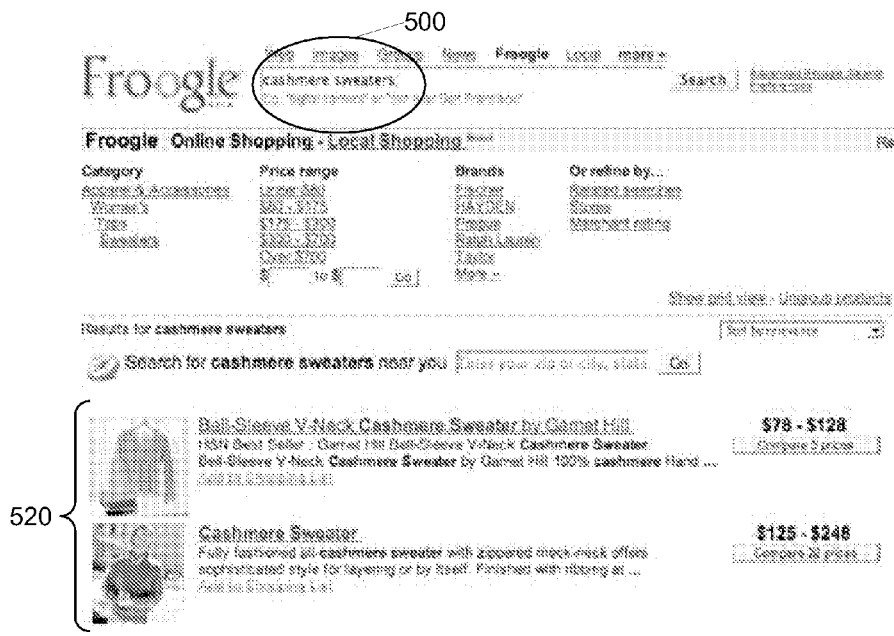
FIG. 7B is a user interface diagram illustrating an example set of results from a Froogle search for product data.

FIGS. 7A and 7B are user interface diagrams illustrating example sets of results from a search for product data from the Google and Froogle search services, respectively. In the illustrated embodiments, the search 500 is for "cashmere sweaters" and each search service produces a responsive list 510 and 520, respectively. In one embodiment, the search service provides a comparison shopping feature and the products that are compared and then provided in the responsive list come from uploads of product data from interested parties. Advantageously, the search server 50 employs the feed module 320 to generate site feed data and provides that site feed data to the respective search engines.

Figure 8:
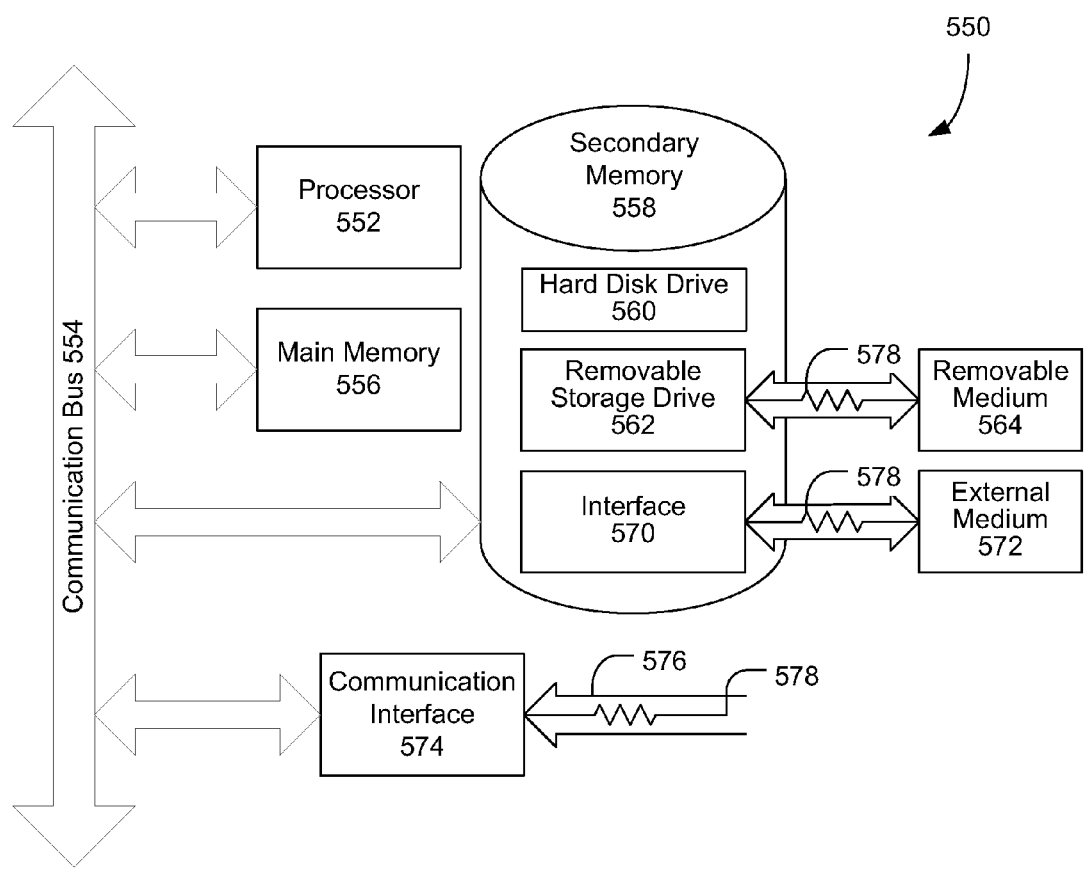
FIG. 8 is a block diagram illustrating an example computer system that may be used in connection with various embodiments described herein.

FIG. 8 is a block diagram illustrating an example computer system 550 that may be used in connection with various embodiments described herein. For example, computer system 550 can be used with the customer browsing device, website server, analytics server, or search server as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A website search system for generating an ordered list of information responsive to a search query of a target website and based on analytics data, the system comprising one or more processors communicatively coupled with one or more computer readable storage devices, wherein the one or more computer readable storage devices comprise one or more computer executable modules, comprising:
a ranking module configured to:
receive a listing of a plurality of web pages of the target website, the listing generated in response to a query for information related to the target website;
obtain website browsing analytics data related to the plurality of web pages of the target website, wherein said website browsing analytics data comprises historical data indicative of prior interactions of a plurality of users with one or more of said plurality of web pages of said target website;

determine a rank for each of said plurality of web pages of said listing based on said website browsing analytics data, such that said ranking is based at least in part on prior interactions of a plurality of users with one or more of said plurality of web pages of said target website; and store said rank in one or more computer readable storage devices.

2. The system of claim 1, wherein the website search system receives the query for information related to the target website and generates an ordered list of information responsive to said query, where the ordered list is ranked according to the determined rank for each web page based on said website browsing analytics data.

3. The system of claim 1, further comprising a feed module stored on said one or more storage devices and configured to generate a search engine feed data input comprising a list of products available on said target website, where the feed data input comprises an ordered list of said available products that is ranked according to the website browsing analytics data.

4. The system of claim 1, further comprising a sitemap module stored on said one or more storage devices and configured to generate a search engine sitemap input comprising a list of each web page in the target website, wherein a plurality of web pages in said list are associated with a priority value calculated based at least partially on the website browsing analytics data.

5. The system of claim 1, wherein said website browsing analytics data comprises a conversion value for one or more of said plurality of web pages of said target website, wherein the conversion value for a particular web page represents a percentage of visitors to the particular web page that take a desired action, such that said ranking is based at least in part on the number of visitors to one or more of the web pages of said target website that take a desired action.

6. A computer implemented method for generating an ordered list of information responsive to a search query and based on analytics data, where one or more processors are programmed to perform steps comprising:

interrogating a target website to identify a set of web pages of the target website;

obtaining from an analytics server via a data communication network, website browsing analytics data related to a plurality of web pages in the set of web pages, wherein said website browsing analytics data comprises historical data indicative of prior interactions of a plurality of users with one or more pages of said plurality of web pages in the set of web pages identified;

calculating a priority value for each of said plurality of web pages in the set of web pages based upon said website browsing analytics data; and creating a search result in response to a query of the target website, wherein said search result comprises a plurality of web pages in the set of web pages in order of their respective priority values.

7. The method of claim 6 further comprising creating a search engine feed data input comprising a list of products available on said target website, where the feed data input comprises an ordered list of said available products that is ranked according to the website browsing analytics data.

8. The method of claim 6 further comprising creating a search engine sitemap data input comprising a list of a plurality of web pages in said target website, wherein at least a portion of said web pages in said list are associated with a relative priority value calculated based on said website browsing analytics data.

9. The method of claim 8 wherein said priority value is calculated based on said website browsing analytics data and a conversion value.

10. A computer implemented method for generating an ordered list of information responsive to a search query and based on analytics data, where one or more processors are programmed to perform steps comprising:

receiving a search query for a target website;

obtaining a list of target website pages that are responsive to the search query, wherein the list of target web pages are not ranked based on website browsing analytics data;

obtaining browsing analytics data for each target website page in said list of responsive pages, wherein said website browsing analytics data for each target website page comprises historical data indicative of prior interactions of a plurality of users with said target website page;

determining a ranking for each target website page in said list of responsive pages based on the website browsing analytics data, wherein the ranking is relative to only the target website pages in said list of responsive pages; and providing an ordered list of information comprising a ranked list of responsive target website pages in response to said search query, wherein the ranked list comprises the responsive target website pages listed in order of their determined ranking in accordance with the website browsing analytics data.

11. The method of claim 10, wherein the website browsing analytics data comprises a conversion value.

12. The method of claim 11, wherein determining a ranking is based on the website browsing analytics data and at least one owner preference.

13. The method of claim 12, wherein the at least one owner preference is the conversion value.

14. The method of claim 11, wherein determining a ranking comprises weighting the conversion value higher than all other weighted values of the website browsing analytics data.

* * * * *